(12) United States Patent
Xiaoyong et al.

(10) Patent No.: US 8,780,700 B2
(45) Date of Patent: Jul. 15, 2014

(54) TRIGGERING A REDUNDANT ROUTER MASTER/BACKUP STATUS CHANGE BASED ON SWITCH CONNECTIVITY

(75) Inventors: Xia Xiaoyong, Bejing (CN); Yang Shuguang, Bejing (CN); Jürgen Bos, Köln (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/642,255

(22) PCT Filed: May 19, 2011

(86) PCT No.: PCT/CN2011/000870
§ 371 (c)(1),
(2), (4) Date: Jan. 29, 2013

(87) PCT Pub. No.: WO2012/155299
PCT Pub. Date: Nov. 22, 2012

(65) Prior Publication Data
US 2013/0201820 A1    Aug. 8, 2013

(51) Int. Cl.
*H04L 12/26*     (2006.01)
(52) U.S. Cl.
USPC .......................................................... 370/220
(58) Field of Classification Search
None
See application file for complete search history.

(56) References Cited

U.S. PATENT DOCUMENTS

| 7,558,195 | B1 * | 7/2009 | Kuo et al. | 370/219 |
| 2002/0184387 | A1 | 12/2002 | Yamaya et al. | |
| 2005/0276215 | A1 * | 12/2005 | Kitani et al. | 370/217 |
| 2007/0047436 | A1 * | 3/2007 | Arai et al. | 370/219 |
| 2009/0296565 | A1 * | 12/2009 | Kuo et al. | 370/219 |
| 2010/0074099 | A1 * | 3/2010 | Balasubramanian et al. | 370/219 |
| 2011/0228669 | A1 * | 9/2011 | Lei et al. | 370/219 |

FOREIGN PATENT DOCUMENTS

| CN | 101051951 A | 10/2007 |
| CN | 101841462 A | 9/2010 |

OTHER PUBLICATIONS

International Search Report and Written Opinion issued in International application No. PCT/CN2011/000870, mailing date Mar. 1, 2012.

* cited by examiner

*Primary Examiner* — Clemence Han
(74) *Attorney, Agent, or Firm* — Potomac Patent Group PLLC

(57) ABSTRACT

Systems and methods according to the exemplary embodiments enable improved switch or link failure handling. A redundant router master/backup status change may be triggered based on switch connectivity. According to an exemplary embodiment, a method is provided. The method includes monitoring a connectivity of a network, detecting a failure, and based on the detected failure, changing the redundant router master/backup status of both a first router and at least a second of router.

20 Claims, 6 Drawing Sheets

TRIGGERING A REDUNDANT ROUTER MASTER/BACKUP STATUS CHANGE BASED ON SWITCH CONNECTIVITY

TECHNICAL FIELD

The present invention relates generally to networking and in particular to triggering a redundant router master/backup status change based on switch connectivity.

BACKGROUND

In current deployed transport networks, such as mobile transport networks, layer 2 transport switches may be used as aggregation sites to aggregate traffic from different cell sites and fixed access sites.

In packet backbone networks, site routers may be adopted at the edge of layer 2 networks (e.g., aggregation sites) to transmit layer 2 switch traffic to layer 3 Internet Protocol/Multiprotocol Label Switching (IP/MPLS) backbone networks (layer 3 networks). In other words, the site routers may act as a bridge from layer 2 to layer 3.

For example, as shown in FIG. 1, multiple layer 2 switches 104-116 may construct a site 102 (layer 2 network) having a ring topology closing with dual site routers 120, 122. Multiple routers 120, 122 may be used to provide static routing redundancy towards the layer 2 network 102 to protect against single point failures. The multiple routers 120, 122 may use Virtual Router Redundancy Protocol (VRRP). According to VRRP, one of the multiple routers 120, 122 may have a master/backup status as master and the remaining router or routers may have a master/backup status as backup. Upon failure of the router that has the master/backup status as master, a redundant router master/backup status change may occur and the backup router or one of the backup routers may then have a master/backup status as master.

Integrated Routing and Bridging (IRB) may combine router functionality with switch functionality in the dual site routers 120, 122. The Ethernet interfaces between the layer 2 transport switches (client nodes) and the Ethernet interfaces between the routers may be configured as layer 2 interfaces. IRB provides the ability to route between a bridged domain and a routed domain with Bridge Group Virtual Interface (BVI). BVI may be used on the routers 120, 122 towards the layer 2 switches.

In an aggregation site including switches and routers, Ethernet Ring Protection (ERP) may act as a ring protection mechanism to provide sub-50 ms protection and recovery switching for Ethernet traffic in a ring topology, and also ensure that no loops are formed at the Ethernet layer. A Ring Protection Link (RPL) Owner Node is responsible for blocking traffic at one end of the RPL to secure link switching during link failure or a recovery condition within the Ethernet ring so that traffic may move towards a layer 3 network 124.

In an aggregation site, such as the aggregation site 102 shown in FIG. 1, ERP is normally supported by the switches 104-116. In order to provide resilience within the whole ring, ERP may be used if all the switches 104-116 support the ERP feature. Alternatively, some switches may not support the ERP feature and may run Spanning-Tree Protocol (STP). In such an instance, an ERP-capable switch can send a Topology Change Notification Bridge Protocol Data Unit (TCN BPDU) to non-ERP switches triggering a MAC Forwarding Database (FDB) flush.

In an aggregation site, such as the aggregation site 102 shown in FIG. 1, once a link or switch failure occurs, the layer 2 network ring will switch based on a configured resilience mechanism such as ERP switching. The failed link or switch will be blocked and traffic will instead go through the unblocked protection link towards the layer 3 network 124 through the site routers 120, 122. For example, as shown in FIG. 1, no switch or link failure has occurred. The layer 2 network ring is such that, for example, traffic from switch 106 is directed through switches 108, 110, 112. FIG. 2 shows the same aggregation site 102 as in FIG. 1 after a link failure. Specifically, the link between switches 110 and 112 is shown as failed. Thereafter, the layer 2 network ring changes and traffic from switch 106 is redirected through switches 104, 116, 114.

However, there remains a need for improvement with respect to switch or link failure handling.

ABBREVIATIONS/ACRONYMS

BVI Bridge Group Virtual Interface
ERP Ethernet Link Protection
CCM Connectivity Check Message
CFM Connectivity Fault Management
IP Internet Protocol
IRB Integrated Routing and Bridging
MEPs Maintenance End Points
MPLS Multiprotocol Label Switching
RPL Ring Protection Link
TCN Topology Change Notification
VRRP Virtual Router Redundancy Protocol

SUMMARY

Systems and methods according to the exemplary embodiments enable improved switch or link failure handling. A redundant router master/backup status change may be triggered based on switch connectivity Among other advantages and benefits, an exemplary embodiment of the present invention may provide for decreased bandwidth consumption on inter-router physical links between redundant routers.

According to an exemplary embodiment, a method is provided. The method includes monitoring a connectivity of a network, detecting a failure, and based on the detected failure, changing the redundant router master/backup status of both a first router and at least a second router. The monitoring is of a network including a plurality of switches, links between the plurality of switches, and a plurality of routers. The plurality of routers are redundant routers with a first router including a master/backup status of master and at least a second of the plurality of routers including a master/backup status of backup. The detecting of a failure is of one of the plurality of switches or links between the plurality of switches. The changing of the redundant router master/backup status is of both the first router and the at least a second of the plurality of routers.

BRIEF DESCRIPTION OF THE DRAWINGS

The accompanying drawings illustrate various aspects of exemplary embodiments which are described herein, wherein.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures, or characteristics may be combined in any suitable manner in one or more embodiments.

Figure 1:
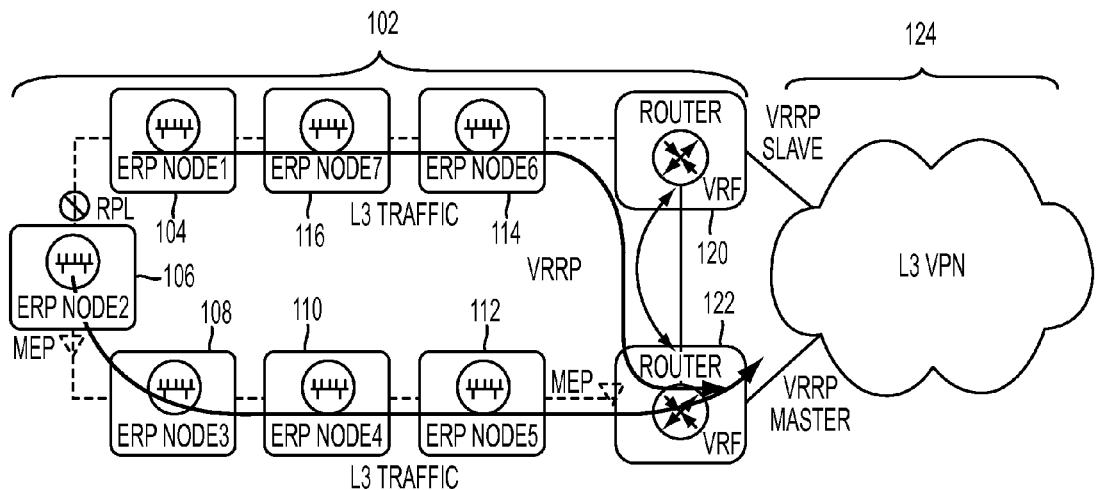
FIG. 1 is a schematic representation of a conventional network.
Figure 2:
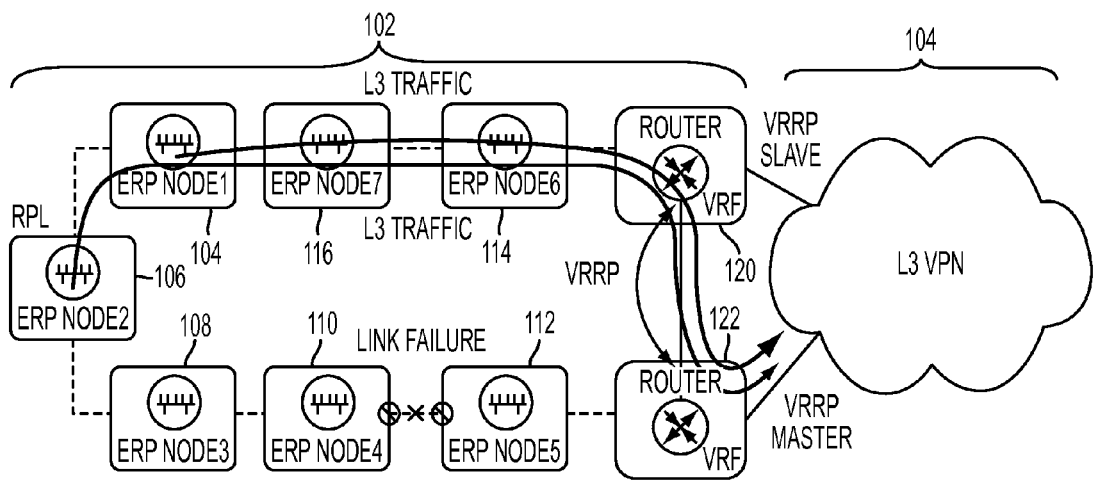
FIG. 2 is a schematic representation of the network of FIG. 1 with a failure.
Figure 3:
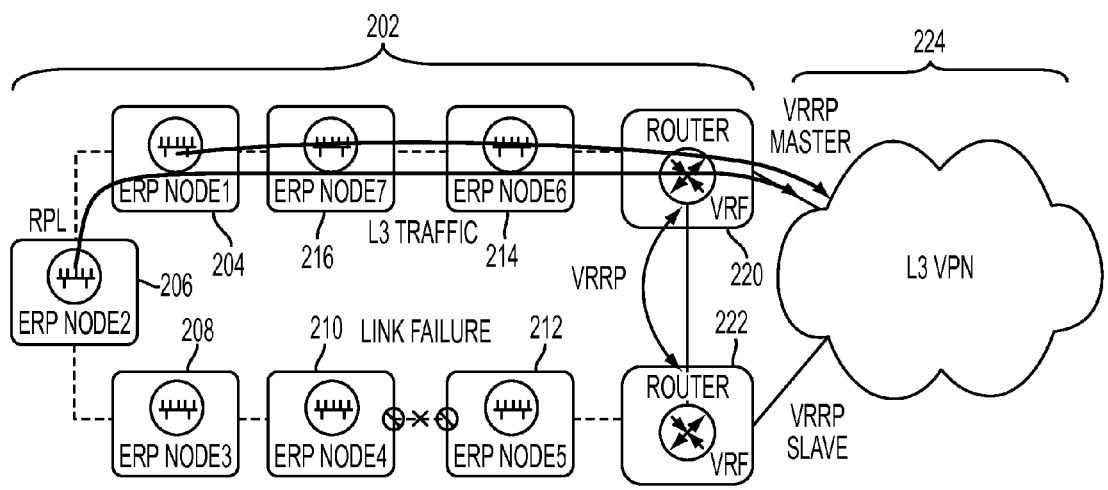
FIG. 3 is a schematic representation of a network.

In a network such as the aggregation site 102 shown in FIG. 2, once the layer 2 network ring has switched based on the configured resilience mechanism and traffic has been redirected, traffic patterns may be adversely affected. This may be due to the change caused by the switch or link failure. For example, in addition to the traffic from switches 104, 116, 114, traffic from switch 106 may also have to travel through router 120 to router 122 to get to the layer 3 network 124. This is due to the master/backup status of router 120 as backup and router 122 as master. While the traffic flows through routers 120, 122 may have been desirable before the link failure, the traffic flows through the routers 120, 122 are adversely affected by the link failure due to a lack of a master/backup status change of the routers 120, 122 in response to the new traffic pattern. For example, bandwidth utilization may be less efficient. This may be especially so in the event of a switch or link failure close to a router having a master/backup status of master. A desirable traffic pattern for the failure scenario shown in FIG. 2 is shown in FIG. 3. As shown in FIG. 3, traffic from switches 206, 204, 216, 214 travel through router 220 to get to the layer 3 network 224. This is possible due to the modified master/backup status of router 220 as master and router 222 as backup. The may lead to, for example, fifty-percent bandwidth being saved relative to the scenario shown in FIG. 2. Accordingly, exemplary embodiments described herein provide for, among other things, triggering a redundant router master/backup status change based on switch connectivity.

Figure 4:
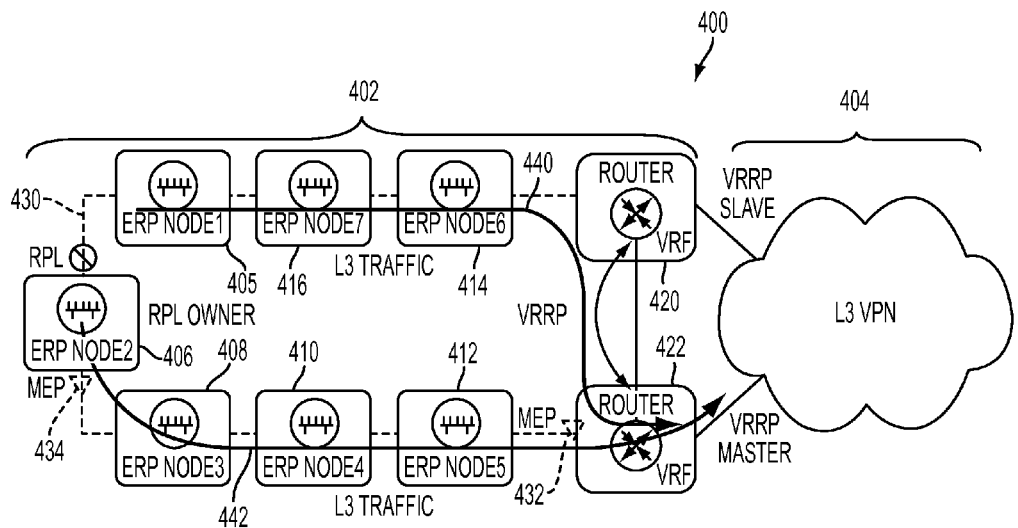
FIGS. 4-6 are schematic representations of a network according to an exemplary embodiment of the present invention.

FIG. 4 is a schematic representation of a network 400 according to an exemplary embodiment of the present invention. The network 400 may be a mobile transport network. The network 400 may include a layer 2 network 402 and a layer 3 network 404. The layer 2 network 402 may be an aggregation site to aggregate traffic from different cell sites and fixed access sites. The layer 3 network 404 may be a packet backbone network such as an IP/MPLS network.

The layer 2 network 402 may include multiple layer 2 switches 405-416. The switches 405-416 may be arranged in a ring topology closing with multiple routers 420, 422. The multiple routers 420, 422 may be used to provide static routing redundancy towards the layer 2 network 402 to protect against single point failures. The multiple routers 420, 422 may use VRRP. At a first point in time, the master/backup status of router 422 may be master and the master/backup status of router 420 may be backup.

The switches 405-416 may support ERP. Alternatively, some switches may not support the ERP feature and may run Spanning-Tree Protocol (STP). In such an instance, an ERP-capable switch can send a Topology Change Notification Bridge Protocol Data Unit (TCN BPDU) to non-ERP switches triggering a MAC Forwarding Database (FDB) flush. Focusing now on the ERP supported embodiment, switch 406 may be an RPL owner node. The link between switch 405 and switch 406 may be an RPL link 430. The RPL link 430 may have a normal status of being blocked when no switch or link failure is detected.

Each of the switches 405-416 and each of the multiple routers 420, 422 may support Connectivity Fault Management (CFM). CFM is an end to end per service instance Ethernet layer operation, administration, and management (OAM) protocol. CFM may include proactive connectivity monitoring, fault verification, and fault isolation for large Ethernet metropolitan area networks (MANs) and wide area networks (WANs). Ethernet service OAM may support fault detection through Continuity Check Messages (CCMs). CCM may support a minimum interval of 3.3 ms.

An IEEE 802.1ag Maintenance Association (MA) may be configured on the network 400. That is, a pair of Maintenance End Points (MEPs) may be configured on the layer 2 network 402. A first MEP 432 may be on a link between router 422 and switch 412 and a second MEP 434 may be on the link between switch 406 and 408

Each MEP 432, 434 may send out "heart-beat" style CCMs periodically. Hence, by configuring a list of expected existent MEPs, the first MEP 432 can detect the health status of its connection to the second MEP 434, and the second MEP 434 can detect the health status of its connection to the first MEP 432. CCMs may pass through the whole link between switch 406, which may be the RPL owner node, and router 422, which has a master/backup status of master. Once a link or switch failure occurs, such failure may cause the first MEP 432 of router 422 to no longer receive CCMs from the second MEP 434 of the switch 406 continuously. This lack of receiving CCMs continuously may indicate the failed status of some portion of the path between MEP 432 and MEP 434. It is conceivable that embodiments of the present invention may involve alternative fault detection mechanisms. For example, Bidirectional Forwarding Detection (BFD) may be used if a switch could support BFD.

An exemplary operation of the network 400 is now described with reference to FIGS. 4-6, which are schematic representations of the network 400 of FIG. 4, and FIG. 7 which is a schematic representation of a method 700 according to an exemplary embodiment of the present invention.

In operation 704, a connectivity of the network may be monitored. In operation 706, it may be determined if failure of one of the switches 405-416 or links between the switches has occurred, e.g., by failure of an MEP to receive CCMs.

In FIG. 4, the network of 400 is shown with no switch or link failure. In the absence of a failure of a switch or a link between switches 405-416, ERP may not block any link, and the RPL link 430 may remain in its default status of being blocked. Accordingly, a first traffic flow 440 travels from switch 405 through switches 416 and 414 and through routers 420 to router 422 to get to the layer 3 network 404. A second traffic flow 442 travels from switch 406 through switches 408-412 to router 422 to get to the layer 3 network 404.

Focusing on the routers, router 422 (first MEP 432) may send out CCMs to the switch 406 (second MEP 434) and the switch 406 may send out CCMs to the router 422. As no switch or link failure has occurred, the CCMs may be received by the router 422 from the switch 406 and by the switch 406 from the router 422. Accordingly, no switch or link failure may be detected.

If in operation 706, it is determined that no failure of one of the switches 405-416 or links between the switches has occurred, the method may proceed to operation 708. In operation 708, the redundant router master/backup status of the routers 420, 422 may remain in a default status. Specifically, the redundant router master/backup status of the routers 420, 422 may remain such that router 420 has the redundant router master/backup status of backup, and router 422 has the redundant router master/backup status of master. As the redundant router master/backup status of the routers 420, 422 has remained in the default status, traffic flows with respect to the routers 420, 422 remain unchanged. Specifically, the first traffic flow 440 travels from switch 405 through switches 416 and 414 and through router 420 to router 422 to get to the layer 3 network 404. The second traffic flow 442 travels from switch 406 through switches 408-412 to router 422 to get to the layer 3 network 404.

Figure 5:
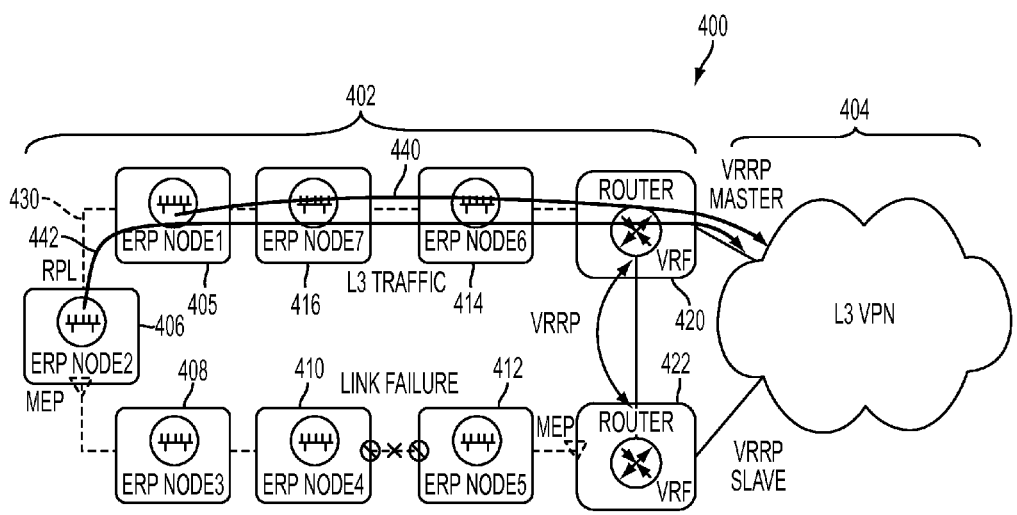

In FIG. 5, the network 400 is shown after a link failure. Specifically, the link between switches 410 and 412 is shown as failed. Upon the failure of the link between switches 410 and 412, ERP on switch 410 may block the failed link, and the RPL link 430 may be changed from its default status of being blocked to being open. Accordingly, the second traffic flow from switch 406 may no longer travel through switches 408-412 to router 422 to get to the layer 3 network 404, but instead may travel through switches 405, 416, and 414, and through router 420 to router 422 to get to the layer 3 network.

Focusing on the routers, router 422 (the first MEP 432) may send out CCMs to the switch 406 (second MEP) and the switch 406 may send out CCMs to the router 422. Due to the link failure between switches 410 and 412, the CCMs from the switch 406 may not be received by the router 422. Accordingly, router 422 detects the link failure occurring between switch 406 and router 422.

If in operation 706, it is determined that a failure of one of the switches 405-416 or links between the switches has occurred, the method may proceed to operation 710. In operation 710, the master/backup status of the routers 420, 422 may be changed (e.g., switched) if the status has not already been switched. Specifically, the redundant router master/backup status of the routers 420, 422 may be changed such that router 420 has the redundant router master/backup status of master, and router 422 has the redundant router master/backup status of backup. As the redundant router master/backup status of the routers 420, 422 has changed relative to the default status, traffic flows with respect to the routers 420, 422 may change. Specifically, the first traffic flow 440 travels from switch 405 through switches 416 and 414 to router 420 to get to the layer 3 network 404. The second traffic flow 442 travels from switch 406 through switches 405, 416, and 414 to router 420 to get to the layer 3 network 404. Neither the first traffic flow 440 nor the second traffic flow 442 may need to travel through the router 420 to the router 422 due to the master/backup status of the routers having been changed. It should be noted that even though the master/backup status of the routers 420, 422 may change, router 422 may continue to be the first MEP.

After operations 708 or 710, the method 700 may return to operation 704. As noted above, a connectivity of the network may be monitored in operation 704. In operation 706, it may be determined if failure of one of the switches 405-416 or links between the switches has occurred.

Figure 6:
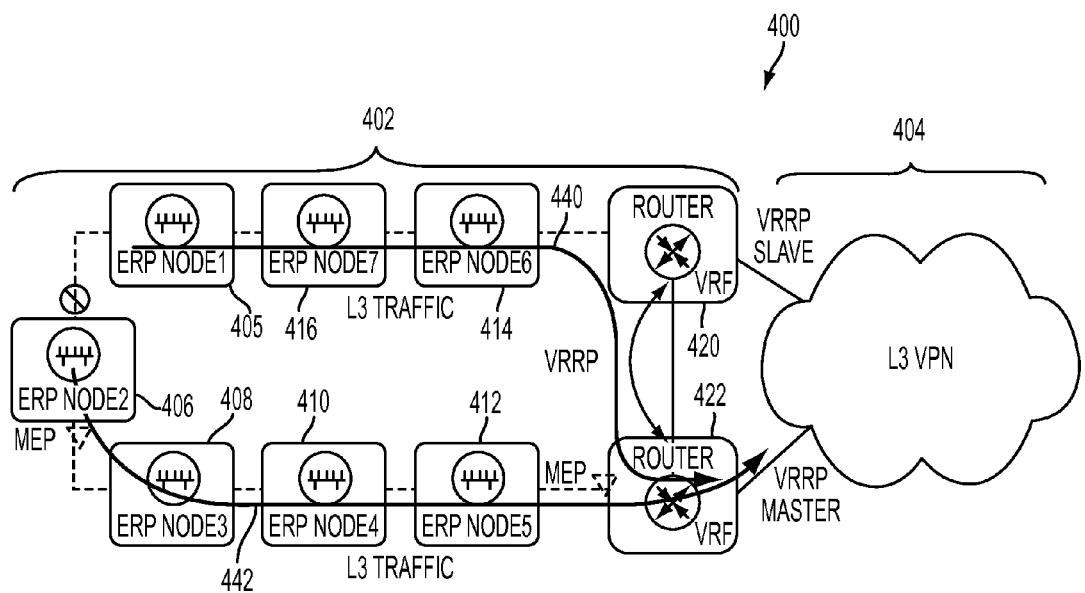
Figure 7:
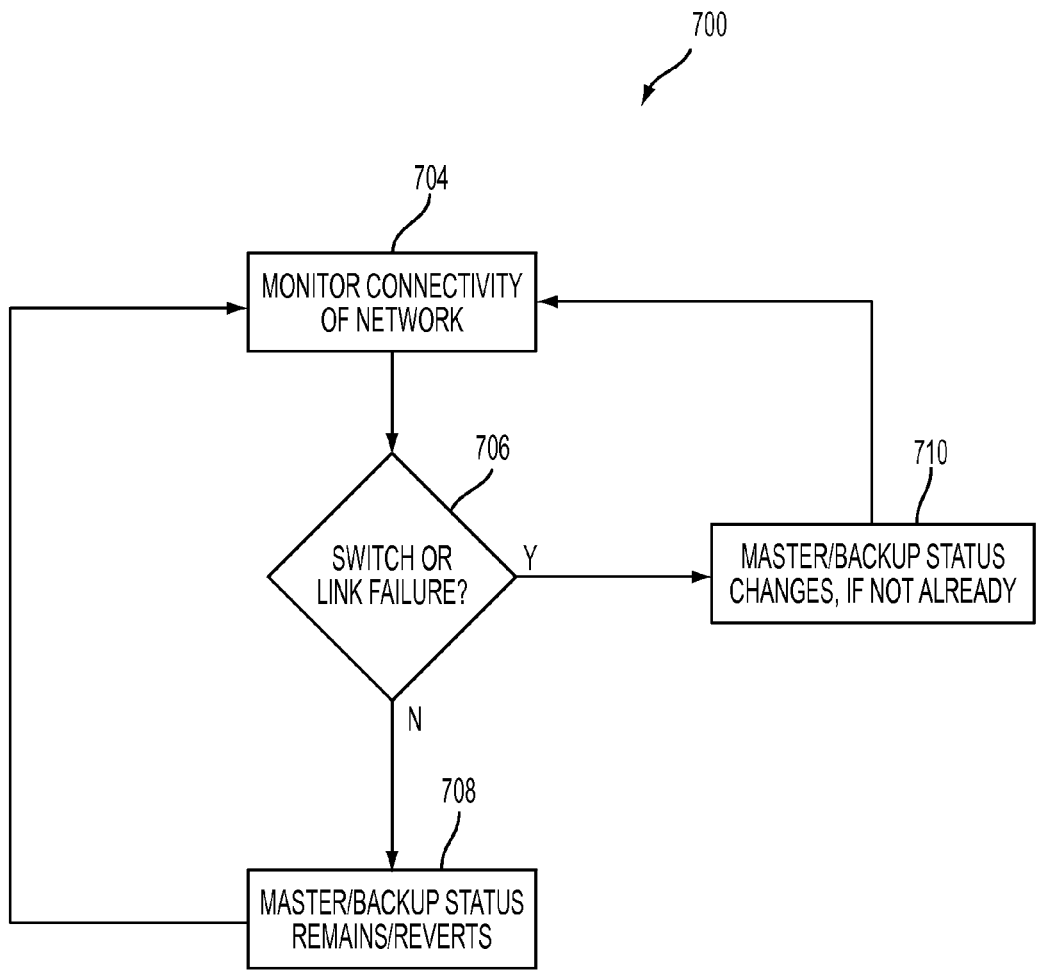
FIG. 7 is a schematic representation of a method according to an exemplary embodiment of the present invention.

In FIG. 6, the network 400 is shown after a link failure recovery. Specifically, the link between switches 410 and 412 (shown in FIG. 5) has been recovered. Upon the recovery of the failed link between switches 410 and 412, ERP on switch 410 may no longer block the recovered link, and RPL link 430 may return to its normal status of being blocked. Accordingly, the second traffic flow 442 from switch 406 may again travel from switch 406 through switches 408-412 and router 422 to router 420 (not shown in FIG. 6) to get to the layer 3 network 404.

Focusing on the routers, router 422 may continue to be the first MEP despite having had its master/backup status switched to backup. Router 422 may send out CCMs to the switch 406 (second MEP) and the switch 406 may send out CCMs to the router 422. As the link between switches 410 and 412 has been recovered, the CCMs may be received by the router 422 from the switch. Accordingly, router 422 detects recovery of the link (i.e., no switch or link failure may be detected).

As noted above, the method may proceed to operation 708 if it is determined that no failure of one of the switches 405-416 or links between the switches has occurred. In operation 708, the redundant router master/backup status of the routers 420, 422 may revert to a default status. Specifically, the redundant router master/backup status of the routers 420, 422 may revert such that router 420 has the redundant router master/backup status of backup, and router 422 has the redundant router master/backup status of master. As the redundant router master/backup status of the routers 420, 422 reverts to the default status, traffic flows with respect to the routers 420, 422 also revert. Specifically, the a first traffic flow 440 travels from switch 405 through switches 416 and 414 and through router 420 to router 422 to get to the layer 3 network 404. The second traffic flow 442 travels from switch 406 through switches 408-412 to router 422 to get to the layer 3 network 404.

Figure 8:
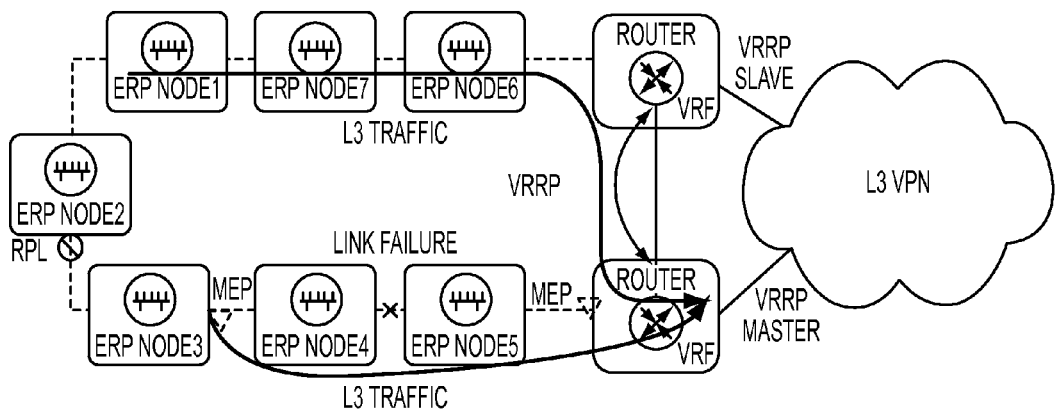
FIG. 8 is a schematic representation of a network according to another exemplary embodiment of the present invention.
Figure 9:
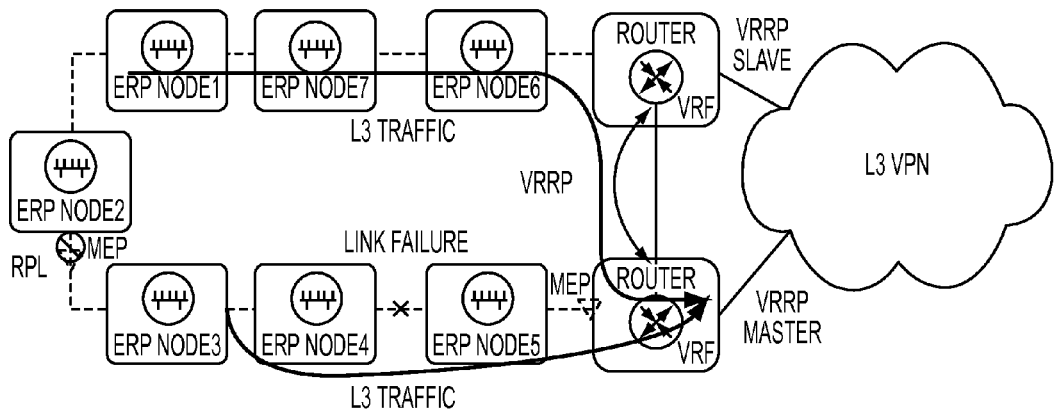
FIG. 9 is a schematic representation of a network according to another exemplary embodiment of the present invention.

It should be noted that the pair of MEPs may be different. The choice of the MA between an ERP switch and a VRRP master should be performed carefully to facilitate desirable traffic distribution. The MA should not span over the RPL link but may be placed close to the RPL owner or RPL node respectively as shown in FIG. 8. Additionally, CFM messages may be configured in a same Virtual Local Area Network which may be used for Ring Automatic Protection Switching (R-APS) messages of ERP without a need to change a MA as shown in FIG. 9.

The preceding describes an approach for triggering a redundant router master/backup status change based on switch connectivity. However, it will be appreciated by those skilled in the art that the preceding is not intended to be exhaustive. For example, the approach for triggering a redundant router master/backup status change based on switch connectivity may be applicable in an embodiment including multiple ERP rings that may be connected by common dual site routers. In such an embodiment, each ERP ring may have its own VRRP instance on the dual site routers. In another example, traffic outage time for ERP and VRRP switching may be decreased. Because an ERP switch may be independent of a VRRP switch, one method to decrease total traffic outage time maybe to cause both of these changes (ERP switch and VRRP switch) to start in parallel. Accordingly the total traffic outage time caused by both of these changes may not exceed more than a maximum time of failure over time from an ERP switch and a VRRP switch respectively. In an exemplary embodiment, a timer may be introduced for time coordination on the VRRP router. Accordingly, a start time for an ERP switch and a VRRP switch may be adjusted by related parameters such as a CCM interval of link detection in an ERP switch, a CCM interval of link detection in a VRRP switch, an advertise interval for VRRP advertisements between a VRRP master and backup routers and the new timer introduced on VRRP router that may ensure that an ERP switch and a VRRP switch run in parallel as much as possible which may lead to less disturbance for an entire system.

The preceding embodiments provide for a number of advantages and benefits. For example, bandwidth consumption on the inter-router physical links may be decreased, especially in the case of a switch or link failure close to a redundant router having a master/backup status of master. This may save physical bandwidth resources of routers, especially in the case of where VRRP requires redundancy link protection between site routers. Additionally, switch or link failure detection by a redundant router may be fast due to the utilization of CFM. As CCMs may be supported to 3.3 ms, a redundant router may detect a switch or link status change quickly and adjust a master/backup relation between redundant routers accordingly. Additionally, traffic latency across inter-router links may be decreased. After a redundant router master/backup status change, all traffic from a layer 2 network may not need to pass through a link between the redundant routers thereby reducing traffic latency.

Systems and methods for processing data according to exemplary embodiments of the present invention may be performed by one or more processors executing sequences of instructions contained in a memory device. Such instructions may be read into the memory device from other computer-readable mediums such as secondary data storage device(s). Execution of the sequences of instructions contained in the memory devices may cause the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method, comprising:
   monitoring a connectivity of a network including a plurality of switches, links between the plurality of switches, and a plurality of routers, the plurality of routers being redundant routers with a first router including a master/backup status of master and at least a second of the plurality of routers including a master/backup status of backup;
   detecting a failure of one of the plurality of switches or links between the plurality of switches; and
   based on the detected failure, changing the redundant router master/backup status of both the first router and the at least a second of the plurality of routers.

2. The method of claim 1, further comprising:
   detecting a recovery of the one of the plurality of switches or links between the plurality of switches; and
   based on the detected recovery, reverting the redundant router master/backup status of both the first router and the at least a second of the plurality of routers.

3. The method of claim 1, wherein the first router including the redundant router master/backup status of master is thereby configured to accept at least a first traffic flow from at least one of the plurality of switches and to transmit the at least a first traffic flow to a layer 3 network, the at least a second of the plurality of routers including a master/backup status of backup is thereby configured to accept at least a second traffic flow from at least one of the plurality of switches and to transmit the at least a second traffic flow to the first redundant router to the layer 3 network.

4. The method of claim 3, wherein the changing of the redundant router master/backup status of both the first router and the at least a second of the plurality of routers thereby changes the first redundant router to transmit the at least a first traffic flow to the at least a second of the plurality of routers to the layer 3 network, and changes the at least a second of the plurality of routers to transmit the at least a second traffic flow to the layer 3 network.

5. The method of claim 1, wherein the network including the plurality of switches, links between the plurality of switches, and the plurality of routers is a layer 2 network.

6. The method of claim 5, wherein the plurality of routers being redundant routers are Virtual Router Redundancy Protocol (VRRP) routers.

7. The method of claim 6, wherein the monitoring of the connectivity of the network includes transmitting and receiving Connectivity Check Messages between a Maintenance Association End Point (MEP) pair.

8. The method of claim 7, wherein the MEP pair includes one of the VRRP routers and one of the plurality of switches.

9. The method of claim 7, wherein the network further includes a Ring Protection Link (RPL).

10. The method of claim 9, wherein one or more of the plurality of switches and links between the MEP pair does not include the RPL.

11. A network, comprising:
    a plurality of switches;
    links between the plurality of switches; and
    a plurality of redundant routers including a first router including a master/backup status of master and at least a second of the plurality of routers including a master/backup status of backup,
    wherein the network includes logic configured to:
    monitor a connectivity of the network;
    detect a failure of one of the plurality of switches or links between the plurality of switches; and
    based on the detected failure, change the redundant router master/backup status of both the first router and the at least a second of the plurality of routers.

12. The network of claim 11, wherein the network further includes logic to:
    detect a recovery of the one of the plurality of switches or links between the plurality of switches; and
    based on the detected recovery, revert the redundant router master/backup status of both the first router and the at least a second of the plurality of routers.

13. The network of claim 11, wherein the first router including the redundant router master/backup status of master is thereby configured to accept at least a first traffic flow from at least one of the plurality of switches and to transmit the at least a first traffic flow to a layer 3 network, the at least a second of the plurality of routers including a master/backup status of backup is thereby configured to accept at least a second traffic flow from at least one of the plurality of switches and to transmit the at least a second traffic flow to the first redundant router to the layer 3 network.

14. The network of claim 11, wherein the changing of the redundant router master/backup status of both the first router and the at least a second of the plurality of routers thereby changes the first redundant router to transmit the at least a first traffic flow to the at least a second of the plurality of routers to the layer 3 network, and changes the at least a second of the plurality of routers to transmit the at least a second traffic flow to the layer 3 network.

15. The network of claim 11, wherein the network is a layer 2 network.

16. The network of claim 15, wherein the plurality of redundant routers are Virtual Router Redundancy Protocol (VRRP) routers.

17. The network of claim 16, wherein the monitoring of the connectivity of the network includes transmitting and receiving Connectivity Check Messages between a Maintenance Association End Point (MEP) pair.

18. The network of claim 17, wherein the MEP pair includes one of the VRRP routers and one of the plurality of switches.

19. The network of claim 18, wherein the network further includes a Ring Protection Link (RPL).

20. The method of claim 19, wherein one or more of the plurality of switches and links between the MEP pair does not include the RPL.

\* \* \* \* \*